US012654353B2

(12) United States Patent (10) Patent No.: US 12,654,353 B2
Du                                    (45) Date of Patent:      Jun. 16, 2026

(54) SERIES TYPE CONTINUOUS AUTOMATIC ENF-GRADE PLYWOOD PRODUCTION LINE AND PRODUCTION METHOD

(71) Applicant: Southwest Forestry University, Kunming (CN)

(72) Inventor: Guanben Du, Kunming (CN)

(73) Assignee: Southwest Forestry University, Kunming (CN)

( * ) Notice: Subject to any disclaimer, the term of this patent is extended or adjusted under 35 U.S.C. 154(b) by 220 days.

(21) Appl. No.: 18/519,036

(22) Filed: Nov. 26, 2023

(65) Prior Publication Data

US 2024/0116205 A1      Apr. 11, 2024

(30) Foreign Application Priority Data

Oct. 8, 2022    (CN) .......................... 202211220599.0

(51) Int. Cl.
*B27D 1/08*        (2006.01)
*B32B 21/14*       (2006.01)
*B32B 37/02*       (2006.01)
*C09J 175/04*      (2006.01)
*B32B 37/12*       (2006.01)
*B32B 38/00*       (2006.01)
*B32B 38/18*       (2006.01)

(52) U.S. Cl.
CPC .............. *B27D 1/083* (2013.01); *B32B 21/14* (2013.01); *B32B 37/02* (2013.01); *C09J 175/04* (2013.01); *B32B 2037/1253* (2013.01); *B32B 2038/0016* (2013.01); *B32B 38/1808* (2013.01); *B32B 2038/1891* (2013.01)

(58) Field of Classification Search
CPC . B27D 1/06; B27D 1/083; B27D 1/04; B27D 5/003; B32B 37/02; B32B 21/14
See application file for complete search history.

(56) References Cited

U.S. PATENT DOCUMENTS

| | | | |
|---|---|---|---|
| 2010/0139095 A1* | 6/2010 | Fuller | ...................... B27D 1/04 29/897.32 |
| 2011/0220271 A1* | 9/2011 | Fyie | ........................ B32B 7/022 156/60 |
| 2018/0215972 A1* | 8/2018 | Yang | ...................... B32B 21/14 |

* cited by examiner

*Primary Examiner* — Scott W Dodds

(74) *Attorney, Agent, or Firm* — Harness, Dickey & Pierce, P.L.C.

(57)                  ABSTRACT

A series type continuous automatic ENF-grade plywood production line and a production method is set forth. The production line is at least composed of three serially connected independent process units with the same processing flow, which are core initialization, thickening circulation and product setting. Each process unit at least includes the following procedures: surface sanding, gluing, automatic lay-up, constant-thickness hot pressing, board overturning and cooling, defect scanning and repairing. The thickening circulation process unit can form a ring-shaped production line through a loop formed by the above procedures, or can form a linear production line by repeatedly extending above procedures. The present disclosure has the beneficial effects that the procedures of aging and prepressing of veneers, which lead to the stagnation of production process, are omitted, and the main obstacles in the continuous and automatic production of plywood are overcome.

6 Claims, 2 Drawing Sheets

Core layer initialization unit       Thickening circulation unit       Product setting unit Initialized core layer        Semi-finished product        Finished product

SERIES TYPE CONTINUOUS AUTOMATIC ENF-GRADE PLYWOOD PRODUCTION LINE AND PRODUCTION METHOD

CROSS-REFERENCE TO RELATED APPLICATION

This patent application claims the benefit and priority of Chinese Patent Application No. 202211220599.0, filed with the China National Intellectual Property Administration on Oct. 8, 2022, the disclosure of which is incorporated by reference herein in its entirety as part of the present application.

TECHNICAL FIELD

The present disclosure relates to a series type continuous automatic ENF-grade plywood production line and a production method, belonging to the technical field of artificial board production.

BACKGROUND

Plywood is prepared by arranging fiber directions of adjacent veneers perpendicular to each other, the anisotropic characteristics of natural wood are significantly improved, and the plywood is endowed with excellent physical and mechanical properties. Plywood is the most important wood-based panel product in the world wood-based panel industry.

The production process of the existing plywood mainly includes: veneer rotary cutting, drying, gluing, lay-up, pre-pressing, hot pressing and post-treatment. At present, the production methods of plywood are one-time gluing, one-time lay-up and one-time hot pressing to reach the target thickness, and the same adhesive is used in the production process.

In the one-time lay-up process, after the gluing procedure of the dried veneer is completed, and the veneer is stacked and aged for a certain time, one-time lay-up is conducted according to the final product thickness requirement. The slab is formed by stacking multiple layers of glued veneers. The slab is prone to core-overlapping, open jointing and other defects in the conveying process due to loosen structure, in order to prevent the defects, a slab pre-pressing procedure is added, the cumulative time of veneer aging and slab prepressing procedures is usually about 120 min, which not only leads to the stagnation of the technological process, but also increases the technological difficulty. For example, the adhesive system needs excellent prepressing performance, which increases the difficulty of resin synthesis and the complexity of gluing process.

In the one-time hot pressing process, due to large thickness and low heat transfer efficiency of the slab, the hot pressing time needs to be prolonged to guarantee the product performance. For example, when a 50-layer vertical hot press is used for producing the plywood of 18 mm, the hot pressing generally lasts for about 60 min, the hot pressing cycle is long, the production efficiency is low, and the pressure load of the hot press is increased. Moreover, with the wide use of urea-formaldehyde resin with low molar ratio in plywood enterprises, the hot pressing cycle has been prolonged to a great extent, which further leads to a significant decline in plywood production efficiency.

In addition, each gluing object is veneers of various formats with a thickness of about 2 mm, or veneers after splicing. When gluing, the veneer is easy to be damaged, which leads to uneven gluing. Manual operation is widely used in the gluing and lay-up process, which has not only low-quality stability but also high labor cost. Meanwhile, the same adhesive is used in the production process, thus it is impossible to adjust and improve the product performance through different adhesive combinations.

In conclusion, the existing plywood production is hard to achieve continuous automatic production due to the restriction of the production process. It takes about 120 min from the time that the veneer is glued to the time that the slab enters the hot press, and about 60 min from the time that the slab enters the hot press to the time that a finished product leaves the hot press. The production efficiency and product performance still need to be improved.

SUMMARY

In view of the shortcomings and disadvantages in the prior art, a series type continuous automatic ENF-grade plywood production line and a production method are provided, which at least partially solve the technical problem that the production line efficiency and the product performance of the plywood need to be improved.

In order to achieve the objective above, multiple relatively independent process units connected in series are used in the series type continuous automatic ENF-grade plywood production line and production method, one-time gluing, one-time lay-up and one-time hot pressing production technology are updated and upgraded. The adopted technical solution is as follows.

By providing a relatively independent core layer initialization process unit, which includes surface sanding, gluing, automatic lay-up, constant-thickness hot pressing, board overturning and cooling, defect scanning and repairing and other procedures, the resin is partially cured, thus providing enough initial strength for the "initialized core layer" and laying a foundation for efficient gluing, lay-up and hot pressing. The "core layer" glued for the second time and later is a semi-finished product obtained by previous hot pressing, which has high bonding strength. There is no need to set up aging and prepressing procedures, and thus there is no process stagnation. The semi-finished product can directly enter the next round of gluing, lay-up and hot pressing procedures, and thus the production cycle of the plywood is greatly shortened. The time for a slab to enter the hot press from gluing can be shortened from about 120 min to about 5 min.

The partial curing of the core layer rein not only can avoid the problem of loosening in the subsequent gluing, lay-up and conveying process to achieve the continuity of the plywood production, but also can significantly shorten the hot pressing cycle in the product setting process, which is conducive to improving production efficiency. As the core layer has the lowest temperature and the slowest curing speed in the traditional hot pressing process, the patrial curing of the core layer resin can make up for such a defect and achieve synchronous curing of core and surface layers, which is beneficial to improve production efficiency.

By providing one or more relatively independent thickening circulation process units including surface sanding, gluing, automatic lay-up, constant-thickness hot pressing, board overturning and cooling, defect scanning and repairing and other procedures, veneers are sequentially glued to both sides of the initialized core layer until the thickness gradually approaches a thickness requirement of a final product. Due to the fact that the resin has been partially cured in the thickening process, a higher surface temperature is maintained, and an adhesive layer that needs to be cured each time is only the adhesive layer below the surface/back board, a heat transfer path is short, and the hot pressing time is greatly shortened. The residence time of the slab in hot press can be shortened from about 60 min to about 5 min.

In order to avoid the pre-curing of adhesive in the gluing process caused by higher surface temperature in the series production process, the production method of the present disclosure is matched by matching different types of adhesives in different process units. For example, an adhesive with a curing temperature of 60-80° C. is used in the core layer initialization process unit, an adhesive with a curing temperature of 80-90° C. is used in the thickening circulation process unit, and an adhesive with a curing temperature of 90-100° C. is used in the product setting process unit. Meanwhile, partial use of isocyanate adhesive can ensure that the formaldehyde emission of the plywood meets the requirements of the national ENF-grade release standard.

In addition, in order to reduce the problems of uneven gluing and high difficulty in process control caused by the thickness deviation of the semi-finished product, a constant-thickness hot pressing technology is employed. A single-opening hot press is controlled by a thickness gage, and a continuous flat hot press is controlled by a position.

In conclusion, by simplifying and reorganizing the process flow, the continuity and automation of plywood production can be achieved, the plywood production mode is upgraded and updated, and the plywood production efficiency is improved.

The present disclosure has the beneficial effects as follows:

Firstly. Hot pressing curing is implemented immediately after each lay-up, and a product obtained by each hot pressing is a core layer for the next lay-up, the slab is endowed with the initial mechanical strength, and it is ensured that no core-overlapping, open jointing and other defects occur in the next gluing and conveying process, continuous automation of plywood becomes possible, the production cycle is shortened, and the production efficiency is improved. The time for a slab to enter the hot press from gluing can be shortened from about 120 min to about 5 min.

Secondly. In the core layer initialization process unit and the thickening circulation process unit, the hot pressing lasts for 120-240 s. As the slab has been partially cured, the hot pressing time in the setting curing process is greatly shortened, which is conducive to improving the production efficiency of the whole production line of the plywood. The hot pressing cycle can be shortened from about 60 min to about 5 min.

Thirdly. Hot pressing curing is implemented immediately after each lay-up, which greatly increases the adaptability of the slab to the adhesive and the sizing technology, the slab can adapt to various gluing methods and gluing speeds, the uniformity of gluing is obviously improved, the glue spread amount is convenient to adjust, and the influence of adhesive viscosity and veneer roughness on the glue layer is also reduced. Moreover, by adding fillers to the adhesive, the influence of uneven veneer thickness on the production process and product performance can be eliminated, and the glue consumption in the plywood production process is reduced.

Fourthly. Various process units are relatively independent, and different adhesives can be matched according to the processing technique and product performance demands, thus increasing the adaptability of plywood production. For example, the isocyanate adhesive is used in part of the process units, which can reduce the formaldehyde emission of the plywood to the national ENF release standard.

Fifthly. As a board overturning procedure is added after each hot pressing, and the problem of warping deformation easily caused by uneven temperature and pressure distribution in the hot pressing process and obvious upper and lower surfaces in the plywood is solved.

Sixthly. Because a higher surface temperature is always maintained in the production process, the plasticity of the plywood slab is increased, and the slab is gradually compressed, which can effectively reduce the pressure load of the hot press. In the successive thickening process, the inter-layer defects of the plywood can be immediately discovered and repaired, such as eliminating the interlayer cracks in the plywood through effective filling in the gluing process, which is conducive to improving the uniformity of plywood performance.

Figure 1:
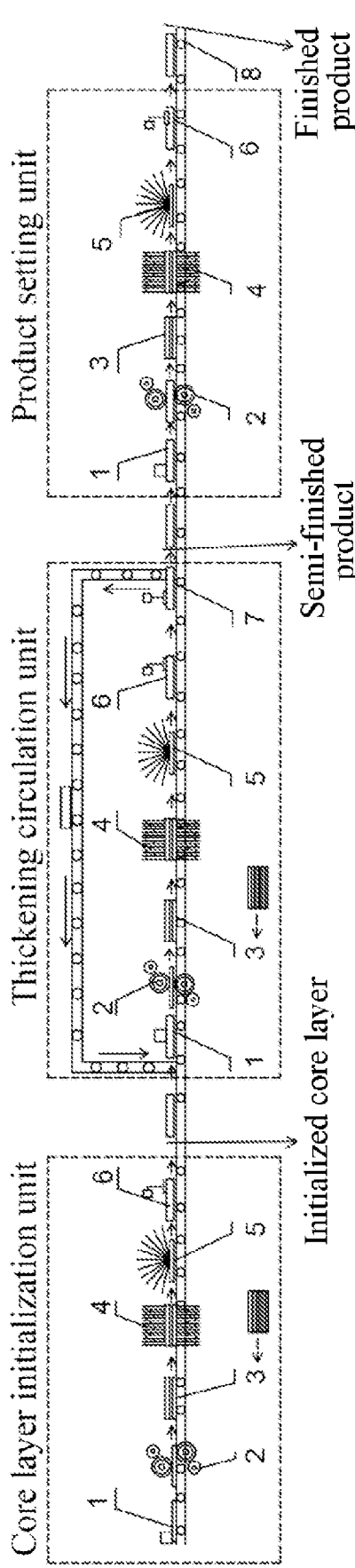
FIG. 1 is a series type continuous automatic ENF grade plywood ring-shaped production line A.
Figure 2:
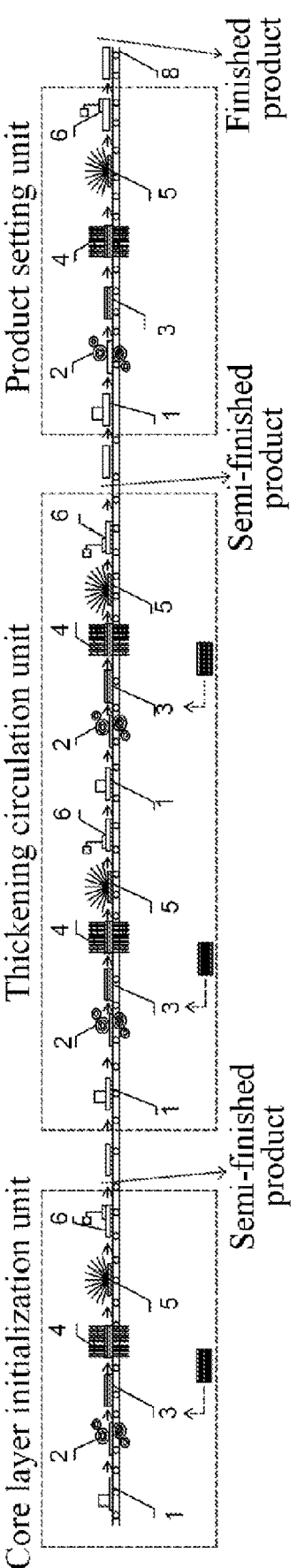
FIG. 2 is a series type continuous automatic ENF grade plywood linear production line B.

In the drawings: 1—sanding machine, 2—glue spreader, 3—automatic lay-up robot; 4—hot press, 5—board overturning and cooling device, 6—defect scanning and repairing device, 7—thickness detection device, 8—conveying device.

DETAILED DESCRIPTION OF THE EMBODIMENTS

In order to better understand the technical solution of the present disclosure, exemplary embodiments of the present disclosure will be described in more detail below with reference to the accompanying drawings. Although exemplary embodiments of the present disclosure are shown in the drawings, it should be understood that the present disclosure can be embodied in various forms and should not be limited by the embodiments set forth herein. On the contrary, these embodiments are provided for a clearer and more thorough understanding of the present disclosure, and will fully convey the scope of the present disclosure to those skilled in the art.

Embodiment 1 Series type continuous automatic production method of plywood with a thickness of 18 mm 1. Sand treatment. A wood veneer with a thickness of 2.2 mm is sanded, and a grain direction of the veneer is a parallel-to-grain direction.

2. Gluing. An adhesive is polymerized diphenylmethane diisocyanate, and glue spread amount on both sides is 100 g/m².

3. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a cross-grain direction.

4. Constant-thickness hot pressing. A single-opening hot press is used for hot pressing for 90 seconds at a temperature of 100° C., and a curing degree of the adhesive is controlled to be 90%, so as to obtain a semi-finished product with a thickness of 6.0 mm.

5. Board overturning and cooling. After board overturning and cooling, a conversion of an upper surface and a lower surface of the preformed semi-finished product is completed, and the surface temperature is 70° C.

6. Defect scanning and repairing. An automatic scanning device is used to distinguish defects and repair the defects such as open jointing on the surface, thus obtaining an initialized core layer.

7. Surface treatment. The initialized core layer of 6.0 mm is sanded.

8. Gluing. An adhesive is hyperbranched melamine-urea-formaldehyde copolycondensation resin modified by polymethylol compound, and the glue spread amount on both sides is 500 g/m².

9. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a parallel-to-grain direction.

10. Constant-thickness hot pressing. A single-opening hot press is used for hot pressing for 120 seconds at a temperature of 100° C., and a curing degree of the adhesive is controlled to be 80%, so as to obtain a semi-finished product with a thickness of 10.0 mm.

11. Board overturning and cooling. After board overturning and cooling, a conversion of an upper surface and a lower surface of the preformed semi-finished product is completed, and the surface temperature is 70° C.

12. Defect scanning and repairing. An automatic scanning device is used to distinguish defects and repair the defects such as open jointing on the surface.

13. A semi-finished product with a thickness of 10.0 mm is returned to the operation 7 by a conveyor belt, and then the operations 7-12 are repeated to obtain a semi-finished product with a thickness of 14.0 mm.

14. Surface treatment. A semi-finished product with a thickness of 14.0 mm is sanded.

15. Setting and gluing. An adhesive is melamine-urea-formaldehyde copolycondensation resin, and the glue spread amount on both sides is 300 g/m².

16. Setting and lay-up. Sheeted veneers with a thickness of 2.0 mm are selected for automatic lay-up by following the principle of perpendicular cross of grains of adjacent veneers and the principle of vertical symmetry of core layers.

17. Setting and hot pressing. The hot pressing is conducted at a temperature of 120° C. for 300 seconds.

18. Finished product cooling. A final product with a thickness of 18 mm is obtained.

The melamine-urea-formaldehyde copolycondensation resin is prepared from melamine, urea and formaldehyde in a weight ratio of 1:15:11, with synthesis steps as follows: adding metered formaldehyde aqueous solution into a reaction kettle, adjusting pH to 5.5 with sodium hydroxide aqueous solution, and adding urea and melamine while stirring; after controlling the temperature at 80° C. and holding the temperature and reacting for 30 min, adjusting the pH to 5.0 with formic acid solution; after controlling the temperature at 85° C. and keeping temperature and reacting for 60 min, adjusting the pH to 7.0 with sodium hydroxide aqueous solution; and controlling the temperature at 60° C. and reacting for 30 min, adding urea, and holding the temperature and reacting for 30 min, thus obtaining the resin.

The hyperbranched melamine-urea-formaldehyde copolycondensation resin modified by polymethylol compound is prepared from melamine, urea, formaldehyde and polymethylol compound in a weight ratio of 1:16:8:0.1, with synthesis steps as follows: adding metered formaldehyde aqueous solution into a reaction kettle, adjusting pH to 7.5 with ethylenediamine, and sequentially adding urea and melamine while stirring; after controlling a temperature at 80° C. and holding the temperature and reacting for 30 min, adjusting the pH to 5.0 with an acidic mixture, adding metered polymethylol compound, controlling the temperature at 60° C., reacting for 30 min, adjusting the pH to 7.0 with sodium hydroxide solution, adding urea, and holding the temperature and reacting for 30 min, thus obtaining the resin.

The plywood production cycle is 5 min, and the formaldehyde emission of the obtained plywood is 0.019 mg/m³.

Embodiment 2 Series type continuous automatic production method of plywood with a thickness of 18 mm 1. Sand treatment. A thin medium-density fiber board with a thickness of 2.2 mm is sanded.

2. Gluing. An adhesive is polymerized hexamethylene diisocyanate, and glue spread amount on both sides is 300 g/m². 3. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a cross-grain direction.

4. Constant-thickness hot pressing. A single-opening hot press is used for hot pressing for 90 seconds at a temperature of 100° C., and a curing degree of the adhesive is controlled to be 90%, so as to obtain a semi-finished product with a thickness of 6.0 mm.

5. Board overturning and cooling. After board overturning and cooling, a conversion of an upper surface and a lower surface of the preformed semi-finished product is completed, and the surface temperature is 70° C.

6. Defect scanning and repairing. An automatic scanning device is used to distinguish defects and repair the defects such as open jointing on the surface, thus obtaining an initialized core layer.

7. Surface treatment. The initialized core layer with a thickness of 6.0 mm is sanded.

8. Gluing. An adhesive is hyperbranched melamine-urea-formaldehyde copolycondensation resin modified by polymethylol compound, and the glue spread amount on both sides is 300 g/m².

9. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a parallel-to-grain direction.

10. Constant-thickness hot pressing. A single-opening hot press is used for hot pressing for 90 seconds at a temperature of 120° C., and a curing degree of the adhesive is controlled to be 60%, so as to obtain a semi-finished product with a thickness of 10.0 mm.

11. Board overturning and cooling. After board overturning and cooling, a conversion of an upper surface and a lower surface of the preformed semi-finished product is completed, and the surface temperature is 70° C.

12. Defect scanning and repairing. An automatic scanning device is used to distinguish defects and repair the defects such as open jointing on the surface.

13. Surface treatment. The semi-finished product with a thickness of 10.0 mm is sanded.

14. Gluing. An adhesive is hyperbranched melamine-urea-formaldehyde copolycondensation resin modified by polymethylol compound, and the glue spread amount on both sides is 300 g/m².

15. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a parallel-to-grain direction.

16. Constant-thickness hot pressing. A single-opening hot press is used for hot pressing for 180 seconds at a temperature of 100° C., and a curing degree of the adhesive is controlled to be 80%, so as to obtain a semi-finished product with a thickness of 14.0 mm.

17. Board overturning and cooling. After board overturning and cooling, a conversion of an upper surface and a lower surface of the preformed semi-finished product is completed, and the surface temperature is 50° C.

18. Defect scanning and repairing. An automatic scanning device is used to distinguish defects and repair the defects such as open jointing on the surface.

19. Surface treatment. A semi-finished product with a thickness of 14.0 mm is sanded.

20. Setting and gluing. An adhesive is melamine-urea-formaldehyde copolycondensation resin, and the glue spread amount on both sides is 300 g/m².

21. Setting and lay-up. Sheeted veneers with a thickness of 2.0 mm are selected for automatic lay-up by following the principle of perpendicular cross of grains of adjacent veneers and the principle of vertical symmetry of core layers.

22. Setting and hot pressing. The hot pressing is conducted at a temperature of 180° C. for 180 seconds.

23. Finished product cooling. A final product with a thickness of 18 mm is obtained.

The melamine-urea-formaldehyde copolycondensation resin is prepared from melamine, urea and formaldehyde in a weight ratio of 1:16:15, with synthesis steps as follows: adding metered formaldehyde aqueous solution into a reaction kettle, adjusting pH to 6.5 with sodium hydroxide aqueous solution, and adding urea and melamine while stirring; after controlling the temperature at 90° C. and holding the temperature and reacting for 30 min, adjusting the pH to 5.5 with formic acid solution; after controlling the temperature at 85° C. and keeping temperature and reacting for 60 min, adjusting the pH to 8.5 with sodium hydroxide aqueous solution; and controlling the temperature at 80° C. and reacting for 60 min, adding urea, and holding the temperature and reacting for 30 min, thus obtaining the resin.

The hyperbranched melamine-urea-formaldehyde copolycondensation resin modified by polymethylol compound is prepared from melamine, urea, formaldehyde and polymethylol compound in a weight ratio of 1:18:10:0.5, with synthesis steps as follows: adding metered formaldehyde aqueous solution into a reaction kettle, adjusting pH to 9.5 with ethylenediamine, and sequentially adding urea and melamine while stirring; after controlling a temperature at 95° C. and holding the temperature and reacting for 30 min, adjusting the pH to 6.5 with an acidic mixture, adding metered polymethylol compound, controlling the temperature at 80° C., reacting for 60 min, adjusting the pH to 8.0 with sodium hydroxide solution, adding urea, and holding the temperature and reacting for 30 min, thus obtaining the resin.

The plywood production cycle is 3 min, and the formaldehyde emission of the obtained plywood is 0.016 mg/m³.

Embodiment 3 Series type continuous automatic production method of plywood with a thickness of 18 mm 1. Surface treatment. Commercially available sheet plastic with a thickness of 6.5 mm is sanded.

2. Gluing. An adhesive is polymerized diphenylmethane diisocyanate, and glue spread amount on both sides is 100 g/m². 3. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a cross-grain direction.

4. Constant-thickness hot pressing. A single-opening hot press is used for hot pressing for 120 seconds at a temperature of 90° C., and a curing degree of the adhesive is controlled to be 80%, so as to obtain a semi-finished product with a thickness of 10.0 mm.

5. Board overturning and cooling. After board overturning and cooling, a conversion of an upper surface and a lower surface of the preformed semi-finished product is completed, and the surface temperature is 60° C.

6. Defect scanning and repairing. An automatic scanning device is used to distinguish defects and repair the defects such as open jointing on the surface, thus obtaining an initialized core layer.

7. Surface treatment. The initialized core layer with a thickness of 10.0 mm is sanded.

8. Gluing. An adhesive is hyperbranched melamine-urea-formaldehyde copolycondensation resin modified by polymethylol compound, and the glue spread amount on both sides is 350 g/m².

9. Lay-up. Sheeted veneers with a thickness of 2.0 mm are selected for lay-up by a robot by following the principle of perpendicular cross of grains of adjacent veneers and the principle of vertical symmetry of core layers, and the grain direction of the upper surface and lower surface is a parallel-to-grain direction.

10. Constant-thickness hot pressing. A single-opening hot press is used for hot pressing for 150 seconds at a temperature of 90° C., and a curing degree of the adhesive is controlled to be 70%, so as to obtain a semi-finished product with a thickness of 14.0 mm.

11. Board overturning and cooling. After board overturning and cooling, a conversion of an upper surface and a lower surface of the preformed semi-finished product is completed, and the surface temperature is 60° C.

12. Defect scanning and repairing. An automatic scanning device is used to distinguish defects and repair the defects such as open jointing on the surface.

13. Surface treatment. A semi-finished product with a thickness of 14.0 mm is sanded.

14. Setting and gluing. An adhesive is melamine-urea-formaldehyde copolycondensation resin, and the glue spread amount on both sides is 290 g/m².

15. Setting and lay-up. Sheeted veneers with a thickness of 2.0 mm are selected for lay-up by following the principle of perpendicular cross of grains of adjacent veneers and the principle of vertical symmetry of core layers.

16. Setting and hot pressing. The hot pressing is conducted at a temperature of 150° C. for 240 seconds.

17. Finished product cooling. A final product with a thickness of 18 mm is obtained.

The melamine-urea-formaldehyde copolycondensation resin is prepared from melamine, urea and formaldehyde in a weight ratio of 1:15:11, with synthesis steps as follows:

adding metered formaldehyde aqueous solution into a reaction kettle, adjusting pH to 5.5 with sodium hydroxide aqueous solution, and adding urea and melamine while stirring; after controlling the temperature at 80° C. and holding the temperature and reacting for 30 min, adjusting the pH to 5.0 with formic acid solution; after controlling the temperature at 85° C. and keeping temperature and reacting for 60 min, adjusting the pH to 7.0 with sodium hydroxide aqueous solution; and controlling the temperature at 60° C. and reacting for 30 min, adding urea, and holding the temperature and reacting for 30 min, thus obtaining the resin.

The hyperbranched melamine-urea-formaldehyde copolycondensation resin modified by polymethylol compound is prepared from melamine, urea, formaldehyde and polymethylol compound in a weight ratio of 1:16:8:0.1, with synthesis steps as follows: adding metered formaldehyde aqueous solution into a reaction kettle, adjusting pH to 7.5 with ethylenediamine, and sequentially adding urea and melamine while stirring; after controlling a temperature at 80° C. and holding the temperature and reacting for 30 min, adjusting the pH to 5.0 with an acidic mixture, adding metered polymethylol compound, controlling the temperature at 60° C., reacting for 30 min, adjusting the pH to 7.0 with sodium hydroxide solution, adding urea, and holding the temperature and reacting for 30 min, thus obtaining the resin.

The plywood production cycle is 4 min, and the formaldehyde emission of the obtained plywood is 0.009 mg/m$^3$.

Embodiment 4 Series type continuous automatic production method of ultrathick plywood with a thickness of 25 mm 1. Grading treatment. A wooded veneer with a thickness of 2.4 mm and with inner layer quality (classified by IX/T 1599-2011 rotary veneer) is used as a core veneer, and the grain direction of the veneer is a parallel-to-grain direction.

2. Gluing. An adhesive is polymerized diphenylmethane diisocyanate, and glue spread amount on both sides is 100 g/m$^2$.

3. Initial lay-up. Five sheeted veneers with a thickness of 2.4 mm are used for lay-up by a robot by following the principle of perpendicular cross of grains of adjacent veneers and the principle of vertical symmetry of core layers, and the grain direction of the upper surface and lower surface is a parallel-to-grain direction.

4. Constant-thickness hot pressing. A single-opening hot press is used for hot pressing for 240 seconds at a temperature of 100° C., and a curing degree of the adhesive is controlled to be 90%, so as to obtain a semi-finished product with a thickness of 10.8 mm.

5. Board overturning and cooling. After board overturning and cooling, a conversion of an upper surface and a lower surface of the preformed semi-finished product is completed, and the surface temperature is 70° C.

6. Defect scanning and repairing. An automatic scanning device is used to distinguish defects and repair the defects such as open jointing on the surface, thus obtaining an initialized core layer.

7. Surface treatment. The initialized core layer with a thickness of 10.8 mm is sanded, and the thickness of the initialized core layer is about 10 mm after sanding treatment.

8. Gluing. An adhesive is hyperbranched melamine-urea-formaldehyde copolycondensation resin modified by polymethylol compound, and the glue spread amount on both sides is 200 g/m$^2$.

9. First thickening lay-up treatment. Two sheeted crossband veneers with a thickness of 2.4 mm and two surface veneers with a thickness of 2.4 mm are selected, and by following the principle of perpendicular cross of grains of adjacent veneers and the principle of vertical symmetry of core layers, one layer of cross-band veneer and one layer of surface veneer are successively laid on each of the upper surface and lower surface of the core layer, and after lay-up, the grain direction of each of the upper surface veneer and lower surface veneer of the slab is a parallel-to-grain direction, and the lay-up is completed by a robot.

10. Constant-thickness hot pressing. A single-opening hot press is used for hot pressing for 200 seconds at a temperature of 100° C., and a curing degree of the adhesive is controlled to be 80%, so as to obtain a semi-finished product with a thickness of 18.5 mm.

11. Board overturning and cooling. After board overturning and cooling, a conversion of an upper surface and a lower surface of the preformed semi-finished product is completed, and the surface temperature is 60° C.

12. Defect scanning and repairing. An automatic scanning device is used to distinguish defects and repair the defects such as open jointing on the surface.

13. Surface treatment. The semi-finished product with a thickness of 18.5 mm is sanded, and the thickness of the initialized core layer is about 17.7 mm after sanding treatment.

14. Setting and gluing. An adhesive is melamine-urea-formaldehyde copolycondensation resin, and the glue spread amount on both sides is 200 g/m$^2$.

15. Second thickening lay-up treatment. A semi-finished product with a thickness of 17.7 mm is returned to the operation 1 by a conveyor belt, and then the operations 7-12 are repeated to obtain a semi-finished product with a thickness of 14.0 mm. Two sheeted cross-band veneers with a thickness of 2.4 mm and two surface veneers with a thickness of 2.4 mm are selected, and by following the principle of perpendicular cross of grains of adjacent veneers and the principle of vertical symmetry of core layers, one layer of cross-band veneer and one layer of surface veneer are successively laid on each of the upper surface and lower surface of the core layer, and after lay-up, the grain direction of each of the upper surface veneer and lower surface veneer of the slab is a parallel-to-grain direction, and the lay-up is completed by a robot.

16. Setting and hot pressing. The hot pressing is conducted at a temperature of 120° C. for 400 seconds, so as to obtain a finished plywood with a thickness of 26.2 mm.

17. Finished product cooling. A final product of the ultrathick plywood with a thickness of about 25 mm is obtained after sanding.

The melamine-urea-formaldehyde copolycondensation resin is prepared from melamine, urea and formaldehyde in a weight ratio of 1:15:11, with synthesis steps as follows: adding metered formaldehyde aqueous solution into a reaction kettle, adjusting pH to 5.5 with sodium hydroxide aqueous solution, and adding urea and melamine while stirring; after controlling the temperature at 80° C. and holding the temperature and reacting for 30 min, adjusting the pH to 5.0 with formic acid solution; after controlling the temperature at 85° C. and keeping temperature and reacting for 60 min, adjusting the pH to 7.0 with sodium hydroxide aqueous solution; and controlling the temperature at 60° C. and reacting for 30 min, adding urea, and holding the temperature and reacting for 30 min, thus obtaining the resin.

The hyperbranched melamine-urea-formaldehyde copolycondensation resin modified by polymethylol compound is prepared from melamine, urea, formaldehyde and polymethylol compound in a weight ratio of 1:16:8:0.1, with synthesis steps as follows: adding metered formaldehyde aqueous solution into a reaction kettle, adjusting pH to 7.5 with ethylenediamine, and sequentially adding urea and melamine while stirring; after controlling a temperature at 80° C. and holding the temperature and reacting for 30 min, adjusting the pH to 5.0 with an acidic mixture, adding metered polymethylol compound, controlling the temperature at 60° C., reacting for 30 min, adjusting the pH to 7.0 with sodium hydroxide solution, adding urea, and holding the temperature and reacting for 30 min, thus obtaining the resin.

The plywood production cycle is 14 min, and the formaldehyde emission of the obtained plywood is 0.022 mg/m$^3$.

Although the embodiments of the present disclosure have been shown and described above, it can be understood that the above embodiments are exemplary and cannot be construed as limitations of the present disclosure. Those skilled in the art can make changes, modifications, substitutions and variations to the above embodiments within the scope of the present disclosure.

What is claimed is:

1. A series type continuous automatic plywood production method, at least comprising the following steps:

(1) core layer initialization comprising:

S10: surface sanding a thin board with a thickness of 2-6 mm as an initial core layer by using an abrasive belt having a 60-120 mesh surface to obtain a first sanded core layer;

S20: gluing the first sanded core layer by coating 100-300 g/m$^2$ of a first adhesive having a curing temperature of 60-80° C. on each side of the first sanded core layer to obtain a first coated core layer;

S30: automatically laying-up the first coated core layer with first sheeted veneer timbers using a robot to obtain a first laid-up core layer, wherein the first sheeted veneer timbers on an upper surface and a lower surface of the first coated core layer have the same grain direction;

S40: subjecting the first laid-up core layer to a first constant-thickness hot pressing at a temperature of 80-100° C., to achieve 80-90% curing in the first adhesive, so as to obtain a first pre-cured semi-finished product;

S50: subjecting the first pre-cured semi-finished product to a first board overturning and a first cooling, to form a first preformed semi-finished product, wherein the first preformed semi-finished product has a surface temperature of 50-70° C.; and S60: defect scanning and repairing by using an automatic scanning device to distinguish defects in the first preformed semi-finished product and repairing detected defects to obtain an initialized core layer;

(2) thickening circulation comprising:

S70: surface sanding the initialized core layer by using the abrasive belt having the 60-120 mesh surface to obtain a second sanded core layer;

gluing the second sanded core layer by coating 200-500 g/m$^2$ of a second adhesive having a curing temperature of 80-90° C. on each side of the second sanded core layer to obtain a second coated core layer;

automatically laying-up the second coated core layer with second sheeted veneer timbers using the robot to obtain a second laid-up core layer, wherein the second sheeted veneer timbers on an upper surface and a lower surface of the second coated core layer have the same grain direction, which is perpendicular to the grain direction of the upper surface and the lower surface of the second coated core layer;

subjecting the second laid-up core layer to a second constant-thickness hot pressing at a temperature of 100-120° C., to achieve 60-80% curing in the second adhesive, so as to obtain a second pre-cured semi-finished product;

subjecting the second pre-cured semi-finished product to a second board overturning and a second cooling, to form a second preformed semi-finished product, wherein the second preformed semi-finished product has a surface temperature of 50-70° C.; and defect scanning and repairing by using the automatic scanning device to detect defects in the second preformed semi-finished product and repairing detected defects to obtain one of a plurality of semi-finished products;

directing a group of the plurality of semi-finished products not reaching a thickness requirement to re-enter the thickening circulation and another group of the plurality of semi-finished products meeting the thickness requirement to enter a product setting process unit after a thickness inspection and shunting procedure; and (3) product setting comprising:

S80: surface sanding one of the another group of the semi-finished products meeting the thickness requirement by using the abrasive belt having the 60-120 mesh surface to obtain a third sanded core layer;

gluing the third sanded core layer by coating 200-500 g/m$^2$ of a third adhesive having a curing temperature of 90-100° C. on each side of the third sanded core layer to obtain a third coated core layer;

automatically laying-up the third coated core layer with third sheeted veneer timbers using the robot to obtain a third laid-up core layer, wherein the third sheeted veneer timbers on an upper surface and a lower surface of the third coated core layer have the same grain direction, which is perpendicular to the grain direction of the upper surface and the upper surface of the third coated layer;

subjecting the third laid-up core layer to a third constant-thickness hot pressing at a temperature of 120-180° C., to achieve 60-80% curing in the third adhesive, so as to obtain a third pre-cured semi-finished product; and subjecting the third pre-cured semi-finished product to a third board overturning and a third cooling, to form a finished product, wherein the finished product has a surface temperature of 50-70° C.

2. The production method according to claim 1, wherein each of the first constant-thickness hot pressing, the second constant-thickness hot pressing, and the third constant-thickness hot pressing lasts for 120-140 seconds.

3. The production method according to claim 1, wherein the first adhesive used in the core layer initialization is a commercially available isocyanate adhesive, the second adhesive used in the thickening circulation is hyperbranched melamine-urea-formaldehyde copolycondensation resin modified by polymethylol compound, and the third adhesive used in the product setting is melamine-urea-formaldehyde copolycondensation resin.

4. The production method according to claim 3, wherein the hyperbranched melamine-urea-formaldehyde copolycondensation resin modified by polymethylol compound is prepared from melamine, urea, formaldehyde and polymethylol compound in a weight ratio of 1:16-18:8-10:0.1-0.5, with synthesis steps as follows: adding metered formaldehyde aqueous solution into a reaction kettle, adjusting pH to 7.5-9.5 with ethylenediamine, and sequentially adding urea and melamine while stirring; after controlling a temperature between 80-95° C. and holding the temperature and reacting for 30 min, adjusting the pH to 5.0-6.5 with an acidic mixture, adding metered polymethylol compound, controlling the temperature between 60-80° C., reacting for 30-60 min, adjusting the pH to 7.0-8.0 with sodium hydroxide solution, adding urea, and holding the temperature and reacting for 30 min, thus obtaining the hyperbranched melamine-urea-formaldehyde copolycondensation resin modified by polymethylol compound.

5. The production method according to claim 3, wherein the melamine-urea-formaldehyde copolycondensation resin is prepared from melamine, urea and formaldehyde in a weight ratio of 1:15-16:11-15, with synthesis steps as follows: adding metered formaldehyde aqueous solution into a reaction kettle, adjusting pH to 5.5-6.5 with sodium hydroxide aqueous solution, and adding urea and melamine while stirring; after controlling the temperature between 80-90° C. and holding the temperature and reacting for 30 min, adjusting the pH to 5.0-5.5 with formic acid solution; after controlling the temperature between 85-95° C. and keeping temperature and reacting for 30-60 min, adjusting the pH to 7.0-8.5 with sodium hydroxide aqueous solution; and controlling the temperature between 60-80° C. and reacting for 30-60 min, adding urea, and holding the temperature and reacting for 30 min, thus obtaining the melamine urea-formaldehyde copolycondensation resin.

6. The production method according to claim 3, wherein the commercially available isocyanate adhesive is polymerized diphenylmethane diisocyanate (PMDI), or polymerized hexamethylene diisocyanate (PHDI).

* * * * *